United States Patent
Plusquellec et al.

(10) Patent No.: US 7,833,596 B2
(45) Date of Patent: Nov. 16, 2010

(54) PLASTIC FLOOR COVERING AND METHOD FOR OBTAINING SAME

(75) Inventors: Paul Plusquellec, Saint Paul Trois Chateaux (FR); Gilles Dogneton, Suze la Rousse (FR)

(73) Assignee: Gerflor, Villeurbanne (FR)

( * ) Notice: Subject to any disclaimer, the term of this patent is extended or adjusted under 35 U.S.C. 154(b) by 0 days.

(21) Appl. No.: 10/312,708

(22) PCT Filed: Jul. 18, 2001

(86) PCT No.: PCT/FR01/02330

§ 371 (c)(1),
(2), (4) Date: Jun. 2, 2003

(87) PCT Pub. No.: WO02/10504

PCT Pub. Date: Feb. 7, 2002

(65) Prior Publication Data

US 2004/0102120 A1    May 27, 2004

(30) Foreign Application Priority Data

Jul. 27, 2000 (FR) ................... 00 09841

(51) Int. Cl.
| | |
|---|---|
| *B60R 21/16* | (2006.01) |
| *F16L 11/08* | (2006.01) |
| *B65D 39/00* | (2006.01) |
| *B32B 5/18* | (2006.01) |
| *B32B 5/24* | (2006.01) |
| *B32B 3/00* | (2006.01) |

(52) U.S. Cl. ............... 428/36.1; 442/59; 442/373; 442/374; 428/36.2; 428/36.5

(58) Field of Classification Search ........... 442/373, 442/374, 221–225, 59–67, 370; 428/71, 428/74, 95, 158, 35.7, 36.5, 96, 36.1, 36.2
See application file for complete search history.

(56) References Cited

U.S. PATENT DOCUMENTS

| 3,076,234 | A | * | 2/1963 | Paulus ............... 264/45.8 |
| 3,399,106 | A | * | 8/1968 | Palmer et al. ........ 428/159 |
| 4,698,258 | A | * | 10/1987 | Harkins, Jr. ......... 442/373 |
| 4,772,500 | A | * | 9/1988 | Stroppiana .......... 428/46 |
| 4,824,498 | A | * | 4/1989 | Goodwin et al. ...... 156/71 |
| 5,204,155 | A | * | 4/1993 | Bell et al. ........... 428/95 |
| 5,578,363 | A | * | 11/1996 | Finley et al. ......... 428/194 |
| 6,013,329 | A |   | 1/2000 | Berenger |
| 6,468,623 | B1 | * | 10/2002 | Higgins ............. 428/95 |

FOREIGN PATENT DOCUMENTS

| EP | 0 831 166 A1 | 3/1998 |
| FR | 2 557 905 | 7/1985 |
| FR | 2 675 178 | 10/1992 |

OTHER PUBLICATIONS

Reese, "Polyester Fibers" Encyclopedia of Polymer Science and Technology, online posting Oct. 22, 2001.*
Database WPI, Section Ch, Week 198832, Derwent Publications Ltd.., London, GB; XP002165500 & JP 63 156149 A (Toyo Linoleum KK), Jun. 29, 1988.

* cited by examiner

*Primary Examiner*—Rena L Dye
*Assistant Examiner*—Jennifer Steele
(74) *Attorney, Agent, or Firm*—Burr & Brown

(57) ABSTRACT

A floor covering produced by coating and including a thermoplastic-based structure, in particular plasticized PVC, reinforced with a textile reinforcement, optionally combined with a foam backing. The visible surface consists of a surface coating providing decoration and wear resistance to the product. The back surface, designed to be in contact with the floor, consists of a textile web, the bonding between the textile structure and the supporting back surface being produced by means of an additional plastisol layer, which penetrates over a minor part of the thickness of the textile structure and which, after gelling, bonds the textile to the thermoplastic substrate back surface.

8 Claims, No Drawings

US 7,833,596 B2

PLASTIC FLOOR COVERING AND METHOD FOR OBTAINING SAME

FIELD OF THE INVENTION

The present invention relates to a new type of plastic floor covering and an improved method implemented to produce said floor covering.

In particular it relates to a floor covering produced according to a technique called "coating" which presents comfortable walking, acoustic and thermal insulation, mechanical resistance and flatness properties that are improved compared to prior products.

BACKGROUND OF THE INVENTION

Flexible plastic floor coverings have been produced for a very long time.

This type of covering generally comprises a thermoplastic base structure which is often reinforced with a textile material embedded in the mass of said thermoplastic.

Also, in order to improve the level of comfort and to provide the covering with insulation and flexibility qualities the reverse surface of said covering may be associated with an underlay, for example a foam underlay.

Furthermore, the upper surface is covered with a finishing layer which provides the floor covering with specific properties such as resistance to UV rays, dirt deposit, scratches, wear, abrasion, etc.

The floor coverings may be produced using different techniques such as coating, calendering, pressing, etc.

In order to create the floor covering using the coating technique a backing sheet is produced by impregnating a reinforcement textile structure, which is generally unwoven, the structure very often being fibreglass based although it can also have a synthetic polymer base, such as polyester, polyamide or polypropylene fibres.

The coating is produced from a plastisol composition, more often than not PVC based, although it can also be acrylic, polyurethane or polyolefin based to provide a smooth, flat surface.

Once the backing sheet has been produced the top layer(s) are created that are intended to provide the decorative and wear-and-tear characteristics. The reverse surface is also produced to ensure the finish (for compact layers) or comfort and/or insulation by associating a mechanical or chemical foam-based underlay.

In addition to floor coverings whose upper surface is flat, for many years now floor coverings have also been proposed that present embossed effects, such as those described particularly in GB-A-1 520 964, U.S. Pat. No. 3,399,106 and U.S. Pat. No. 4,244,899, EP-A-0 003 965 and FR 2 557 905. When these embossed floor coverings are produced a chemical foam, onto which a pattern is printed using inks some of which contain expansion inhibitors, as inserted between the resin-impregnated base structure and the surface layers.

Once the wear layer has been applied to the pattern thus produced, all the layers are gelled together which causes different degrees of expansion between the inhibited printed zones and the uninhibited printed zones and produces an embossed decorative surface, the degree of expansion being lower in the inhibited printed zones.

These types of floor coverings, which have proved to be extremely popular, are widely used nowadays. Nevertheless, they present acoustic and thermal insulation characteristics that are sometimes considered insufficient.

To overcome the drawback the only proposal envisaged therefore consisted in applying a mechanical or chemical foam to the reverse surface which, if a low-density foam is used, can affect the solidity of the covering and the plastic feel provided by this type of underlay often discourages potential buyers.

The level of comfort when walking on the covering is often considered insufficient, comfort being the result of several factors such as the feeling of softness (immediately sinking into the covering) which should be maximum, anti-impact (progressive deceleration) and anti-bounce (nil bouncing speed).

SUMMARY OF THE INVENTION

The purpose of the present invention is to offer an improvement to floor coverings produced using coating techniques and comprising a thermoplastic, particularly plasticized PVC, base structure reinforced by a fabric backing, possibly associated with a foam underlay, the upper surface of which consists of a surface coating which provides the covering with the pattern and resistance to wear.

The material according to the invention is characterised in that the reverse surface intended to be brought into contact with the floor consists of a textile cloth, preferably unwoven, the link between the textile structure and the reverse surface of the backing sheet being created by the intermediary of an additional plastisol layer which penetrates slightly into the matter of the textile structure and which, after gelling, bonds said textile to the rear of the thermoplastic backing sheet.

According to a first embodiment the textile structure is fastened directly to the reverse surface of the backing sheet via a plastisol layer which smoothes said surface.

If the reverse surface of the floor covering comprises a layer of foam the textile structure is bonded via a layer of plastisol.

Although the floor covering according to the invention may have a flat surface layer said surface layer may also comprise embossed patterns obtained by localised expansion of a layer of foam inserted between the backing sheet and surface layer(s).

It should be noted that, according to the invention, the textile or unwoven sheet present on the reverse surface of the backing is only partially embedded in the plastic layer bonding it to the reverse of the covering in order to retain the textile feel and characteristics of the cloth.

In general the impregnation by the layer of plastisol is between 0.5 and 15% of the total thickness of the textile, preferably between 3 and 10%.

The textile structure intended to create the reverse of the coating is preferably unwoven, preferably needled and consists advantageously of polyester fibres.

The unwoven textile may be calendered and/or thermobonded, the thickness being between 0.5 and 5 millimeters, preferably between 1 and 2 millimeters.

It has been observed that if the thickness is less than 0.5 millimeters the result is a degree of relative impregnation of the bonding plastisol which is too high and which affects not only the textile feeling of the reverse surface but also the additional insulation and comfort characteristics provided by this type of textile structure.

On the other hand, thickness greater than 5 millimeters does not significantly improve the product characteristics but it does present the disadvantage of greatly increasing the cost.

The weight per square meter of the unwoven textile applied to the reverse surface may be between 40 and 500 grams but is advantageously between 80 and 300 grams. The elongation capacity is between 30 and 120%.

The invention also relates to a method for producing this type of covering.

In general, according to the invention, in an initial operating phase standard techniques are used to produce a base structure by impregnating a fabric backing, for example a fibreglass surfacing mat, with a PVC or acrylic plastisol or a polyolefin pre-gelled by thermal treatment.

In a second operating phase after printing, a surface coating is then produced in a continuous operation.

According to the invention, and preferably in a continuous operation with those mentioned above, a PVC, acrylic plastisol or polyolefin or other polymer based bonding layer is applied to the reverse surface of the complex thus produced, and a textile cloth, which is preferably unwoven, is applied to this wet layer using sufficient pressure to partially impregnate said cloth with plastisol. The pressure applied is generally between 0.1 and 4 bar maximum.

The layers are then gelled together by thermal treatment which enables the final complex to be obtained, the gelling or re-heating phase bonding the textile structure on the reverse surface to the plastic section.

This type of method may be implemented to produce floor coverings the decorative surface of which is flat but it may also be applied to produce a floor covering with an embossed decorative surface.

For embossed finishes, once the reinforcement textile has been impregnated with a plastisol which is then pre-gelled, for example on a drum heated to 135° C., the surface of this base structure is coated with a decorative chemical foam which is also PVC, acrylic or polyolefin based. The chemical foam is also gelled at 140° C. to achieve a flexible sheet with a smooth surface onto which a pattern is printed using inks some of which contain expansion inhibitors.

The wear layer is then applied to the pattern and all the layers are gelled together in an oven by thermal treatment at 195° C.

The decorative chemical foam also expands during this stage.

DETAILED DESCRIPTION

The invention and advantages it offers will be better understood from the following concrete examples which are for information only and are non-limitative.

The examples relate to floor coverings with an embossed decorative surface produced according to the teachings of U.S. Pat. No. 3,399,106 or EP 0 003 965, but these examples are clearly non-limitative.

The formulations, which are expressed in parts by weight, of the various plastisol compositions included to produce the floor coverings given as examples are grouped together in the table below.

Also the characteristics of the coverings produced are determined as follows:
  acoustic insulation: measured according to standard ISO 140-8 and ISO 717-2,
  temperature: measured by the cold-feet test.

Such a test is performed in a room maintained, to within one degree, at 23° C. on a refrigerated bench the temperature of which is maintained at 0° C.

The floor covering is applied to the bench and the temperature of the upper surface is measured after 30 minutes.

The higher the temperature, the greater the thermal insulation and the greater the relief from the feeling of cold feet.
  Comfortable walking: measured according to standards NFP 90-104 and NFP 90-203 and evaluated by the level of softness as measured when the foot immediately sinks into the covering.

| | BASE COMPLEX (A) | | | | | |
|---|---|---|---|---|---|---|
| | Impregnation | Decorative chemical foam | Wear layer | Smoothness | Reverse surface chemical foam | Reverse surface mechanical foam |
| PVC emulsion K 80 (*) | 0 | 0 | 85 | 0 | 0 | 0 |
| PVC microsuspension K 80 (*) | 0 | 0 | 35 | 50 | 0 | |
| PVC suspension K 100 (*) | 0 | 0 | 40 | 0 | 0 | 0 |
| PVC emulsion K 75 (*) | 75 | 0 | 0 | 30 | 0 | 60 |
| PVC emulsion K 70 (*) | 0 | 95 | 0 | 0 | 0 | 0 |
| PVC emulsion K 65 (*) | 0 | 0 | 0 | 0 | 55 | |
| PVC suspension K 65 (*) | 0 | 30 | 0 | 20 | 0 | 40 |
| PVC emulsion K 60 (*) | 0 | 0 | 0 | 0 | 52.5 | 0 |
| Dioctylphthalate | 55 | 60 | 27.2 | 0 | 22.2 | 27.6 |
| Butyl benzyl phthalate | 0 | 0 | 40.3 | 0 | 38.7 | 0 |
| Diisoheptylphthalate | 0 | 0 | 0 | 42.6 | 0 | 27.8 |
| Dodecylbenzene | 0 | 4.2 | 8.4 | 7.5 | 4.2 | 10.4 |
| Tin stabiliser | 0.4 | 0 | 4.5 | 0.8 | 0 | 0.5 |
| Epoxidised soya bean oil | 0 | 0 | 5.6 | 0 | 0 | 0 |
| Titanium dioxide | 2.5 | 0.3 | 0 | 0 | 0 | 0 |
| Zinc oxide | 0 | 1.2 | 0 | 0 | 1.3 | 0 |
| Calcium carbonate 6 μm | 20 | 0 | 0 | 15 | 0 | 0 |
| Calcium carbonate 15 μm | 70 | 30 | 0 | 55 | 60 | 30 |
| Wetting agent | 1.1 | 0.1 | 0.3 | 2.2 | 0 | 0 |
| Anti UV | 0 | 0 | 0.3 | 0 | 0 | 0 |
| Expanding agent | 0 | 2.4 | 0 | 0 | 6 | 0 |
| Foaming agent | 0 | 0 | 0 | 0 | 0 | 2.5 |
| Fungicide | 0 | 0 | 0 | 0 | 3.6 | 0 |

(*) K = K value

Example 1

This example shows how a standard floor covering is produced by coating.

A sheet of fibreglass, which is 0.4 millimeters thick and which weighs 40 grams per square meter, is coated with 390 grams per square meter of filled PVC plastisol the formulation of which, in parts by weight, is shown in the "impregnation" column above.

The sheet thus impregnated is then positioned on a drum heated to 135° C. to be pre-gelled.

The surface of the flexible sheet thus produced is then coated with 320 grams per square meter of a PVC plastisol-based decorative chemical foam.

The coated structure is then pre-gelled in an oven heated to 140° C.

It is then printed by heliography using inks that may contain inhibitors to produce an embossed decorative effect.

230 grams per square meter of a wear layer, which is an unfilled PVC plastisol-based layer, is then applied to the printed surface and all the layers are gelled together in an oven heated to 190° C.

The heat also causes the decorative foam to expand and create the embossed effect.

A base A complex is thus obtained.

In order to produce a standard covering, after the decorative foam has expanded a finishing treatment is applied to the reverse surface by coating the rear with 490 grams per square meter of smoothing PVC plastisol the formulation of which, in parts by weight, is shown in the table above.

Thus prepared, the floor covering is 2 millimeters thick and weighs 1720 grams per square meter.

This type of floor covering is perfectly flat, the reverse surface consisting of the smoothing compact, which is smooth to the touch.

It presents the following main characteristics:
Acoustic insulation: 7 decibels (dB),
Thermal insulation: measured using the cold-feet test: 4° C.,
The level of comfort when walking on the covering cannot be measured due to the stiffness of the covering.

Example 2

This example shows how a floor covering is produced according to the invention.

Compared to the floor covering produced as standard in example 1, according to the invention, the reverse surface of complex A is coated with a smoothing PVC plastisol composition which is also smoothing PVC plastisol-based (see formulation in the table) but which is only coated at a rate of 160 grams per square meter, and a sheet of unwoven, thermobonded, polyester textile weighing 125 grams per square meter and 1.1 millimeter thick is unrolled onto the plastisol while still wet.

Pressure of 1 bar is applied using a compression roller the force of which is adjusted to enable the plastisol to slightly penetrate into the matter of the unwoven sheet.

The layers are then put into an oven heated to 180° C. for the final gelling and to ensure the bonding of the unwoven sheet.

The floor covering thus prepared is approximately 2 millimeters thick and weighs 1215 grams per square meter. It is perfectly flat. The reverse surface comprising the unwoven textile is soft, pleasant and warm to the touch.

The PVC plastisol penetrates approximately 0.08 millimeters into the unwoven textile sheet.

Compared to the standard covering in example 1, which only comprises a smoothing layer on the reverse surface, the covering according to the invention offers acoustic insulation of 16 decibels (dB) measured according to the same standards, i.e. a significant improvement.

Also, the temperature measured in the cold-feet test is 10° C., i.e. a significant improvement, and the comfort when walking is evaluated by the degree of softness, the foot immediately sinking into the covering to a depth of 1.15 millimeters.

Example 3

This example illustrates a second embodiment of the invention.

In the initial phase a complex A is produced similar to that in example 1 and comprising an impregnated fibreglass surfacing mat, a decorative chemical foam and an identical wear layer.

After this complex has been created the reverse surface is coated with chemical foam plastisol the formulation of which is given in the table above.

Onto this layer of expanded and calibrated foam a bonding plastisol layer is deposited onto which is unrolled a sheet of unwoven, thermobonded, polyester-based textile weighing 125 grams per square meter and the thickness of which is 1.1 millimeters.

Pressure of 1 bar is also applied to enable the plastisol to slightly penetrate the unwoven sheet.

The layers are then also put into an oven heated to 180° C. for the final gelling and to ensure the bonding of the unwoven sheet.

The floor covering thus prepared is approximately 3 millimeters thick and weighs 1,360 grams per square meter.

It is perfectly flat.

The reverse surface comprising the unwoven textile is soft, pleasant and warm to the touch.

The PVC plastisol penetrates 0.08 millimeters into the unwoven textile.

The acoustic insulation measured is 19 decibels (dB).

The temperature measured in the cold-feet test is 15° C.

The comfort when walking is evaluated by the degree of softness, the foot immediately sinking into the covering to a depth of 1.32 millimeters.

Example 4

As a comparison, this example shows the characteristics presented by a standard floor covering with a PVC mechanical foam underlay.

The only difference between the present example and example 1 is that instead of using a smoothing plastisol to create a finishing treatment of the reverse surface said surface is coated with 980 grams per square meter of a PVC mechanical foam plastisol (see formulation in the table).

The layers are then put into an oven heated to 180° C. for the final gelling.

A floor covering is obtained that is 3 millimeters thick and that weighs 2,145 grams per square meter.

This floor covering is perfectly flat but the reverse surface, which consists of mechanical foam, is smooth in appearance and is plastic to the touch.

The acoustic insulation is 15 decibels (dB).

The temperature measured in the cold-feet test is 5° C., i.e. significantly worse than that for the coating made according to the invention.

The comfort when walking is evaluated by the degree of softness, the foot immediately sinking into the covering to a depth of 1.01 millimeters, i.e. considerably less than that obtained according to the invention in example 3 despite a significant increase in the thickness of foam.

The above examples clearly show the advantages provided by the invention which consist not only in a very good level of acoustic insulation, an improvement in the results of the cold-feet test but also excellent comfort when walking and softness, the reverse surface comprising an unwoven textile also providing the covering with a soft, pleasant and warm feeling to the touch.

The presence of the textile backing also enables the coating to be implemented by any system recommended for textile coatings, particularly the self-adhering-type systems.

The invention claimed is:

1. A floor covering produced using coating techniques, said floor covering comprising:
   a fiberglass mat;
   a thermoplastic base structure impregnating said fiberglass mat;
   a surface layer provided on an upper surface of said impregnated fiberglass mat providing coloring, decoration, and resistance to wear;
   a plastisol layer adhered to a lower surface of said impregnated fiberglass mat; and
   a non-woven polyester textile web adhered to said plastisol layer, said textile web having a thickness between 0.5 and 5.0 millimeters, having an elongation capacity between 30 and 120 percent, and having a weight per square meter between 80 and 300 grams, said plastisol layer penetrating said textile web a distance between 0.5 and 15 percent of the thickness of said textile web;
   wherein said textile web defines a lowermost surface of said floor covering.

2. A floor covering as claimed in claim 1, wherein said thermoplastic base structure comprises plasticized polyvinyl chloride (PVC).

3. A floor covering as claimed in claim 1, further comprising a foam underlay provided between said lower surface of said impregnated fiberglass mat and said plastisol layer.

4. A floor covering as claimed in claim 3, wherein said foam underlay is formed using a plastisol chemical foam.

5. A floor covering as claimed in claim 3, wherein an acoustic insulation characteristic is about 19 dB, a thermal insulation characteristic is 15° C., and a comfort when walking characteristic according to NFP 90-104 and NFP 90-203 and evaluated by the level of softness as measured by a depth of a foot sinking into said floor covering, is about 1.3 mm.

6. A floor covering as claimed in claim 1, wherein said plastisol layer smooths said impregnated fiberglass mat.

7. A floor covering as claimed in claim 1, wherein said surface layer comprises embossed patterns obtained by a localized expansion of a layer of foam inserted between said upper surface of said impregnated fiberglass mat and said surface layer.

8. A floor covering as claimed in claim 1, wherein an acoustic insulation characteristic is 16 dB, a thermal insulation characteristic is 10° C. and a comfort when walking characteristic according to NFP 90-104 and NFP 90-203 and evaluated by the level of softness as measured by a depth of a foot sinking into said floor covering, is about 1.15 mm.

* * * * *